United States Patent [19]
Baker

[11] 3,830,014
[45] Aug. 20, 1974

[54] TREE CANOPY HEATER

[76] Inventor: Alfred R. Baker, c/o Sun & Ski, 1105 Cypress Gardens Rd., Winter Haven, Fla. 33880

[22] Filed: Feb. 14, 1973

[21] Appl. No.: 332,335

[52] U.S. Cl.............. 47/1.7, 47/2, 239/130, 239/159
[51] Int. Cl..... A01g 13/06, A01g 15/00, B05b 1/24
[58] Field of Search.......... 47/1.7, 2, 1, 58; 239/77, 239/78, 135, 136, 170, 130, 436, 443, 444, 551, 563, 99

[56] References Cited
UNITED STATES PATENTS

| | | | |
|---|---|---|---|
| 703,316 | 6/1902 | Smith | 239/136 X |
| 1,111,993 | 9/1914 | Carder | 239/135 X |
| 1,238,861 | 9/1917 | Williams et al. | 239/136 |
| 2,154,002 | 4/1939 | Kerrick | 47/2 |
| 2,297,110 | 9/1942 | Parker | 239/77 |
| 2,686,990 | 8/1954 | Matthews | 47/58 |
| 2,908,994 | 10/1959 | Jedrzykowski | 239/77 |
| 3,008,269 | 11/1961 | Creswell | 47/2 |
| 3,016,653 | 1/1962 | Gardner | 47/1.7 |
| 3,086,713 | 4/1963 | Moldenhauer | 239/136 |
| 3,395,485 | 8/1968 | Rooklidge | 47/2 |

FOREIGN PATENTS OR APPLICATIONS

| | | | |
|---|---|---|---|
| 224,128 | 9/1959 | Australia | 239/136 |
| 49,831 | 8/1939 | France | 47/1.7 |

Primary Examiner—Robert E. Bagwill
Assistant Examiner—Steven A. Bratlie
Attorney, Agent, or Firm—Clarence A. O'Brien; Harvey B. Jacobson

[57] ABSTRACT

A grove heater having a steam generator and steam ejecting device is mounted on a vehicle maneuverable among trees in a grove such as a citrus orchard. The steam is retentively injected into canopies formed by leaves on the trees for preventing cold dehydration of the trees. The steam ejecting devices have valves controlled by tree detecting elements associated with the valves.

3 Claims, 3 Drawing Figures

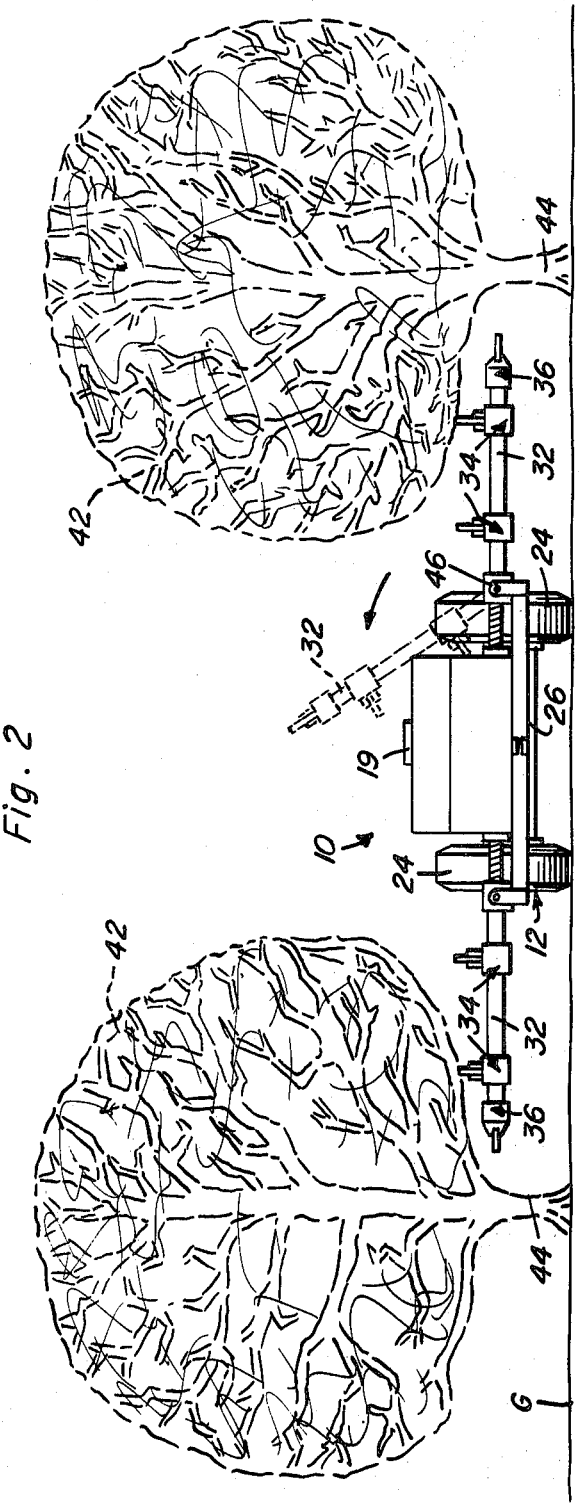
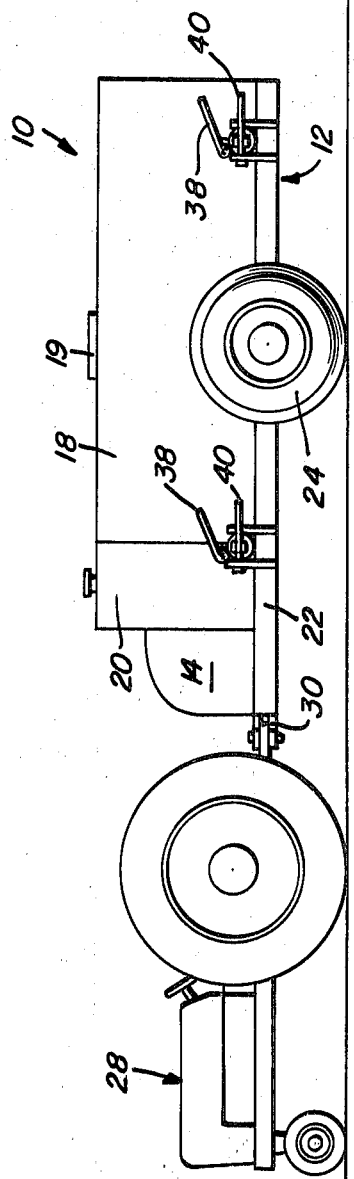
Fig. 2
Fig. 3

TREE CANOPY HEATER

BACKGROUND OF THE INVENTION

1. Field of the Invention

This invention relates generally to a grove heater, and specifically to a heat and moisture injecting system that uses the canopy formed by the leaves of a tree to retain a hot vapor.

2. Description of the Prior Art

A paper by Dr. William Grierson entitled Grove Heating: Some Thermodynamic Considerations, presented at the Annual Meeting of the Florida State Horticultural Society on Nov. 6, 1964, and published in the December 1964 issue of "Citrus and Vegetable Magazine" shows that moisture gained from the passage of air over bodies of water such as lakes may be largely responsible for groves on the downwind side of bodies of water enjoying a marked degree of cold protection during freezes. Advantages cited for combined heat and humidification of trees are: (1) release of latent heat as sensible heat by condensation and freezing of the added moisture; (2) decrease of the drying action due to cold dry winds that cause a desiccation known to be damaging to non-dormant leaves and twigs; and (3) restriction of the cooling effect due to evaporation from the leaves.

Devices have been proposed for enveloping orchards in steam fogs. Examples of stationary units intended for this purpose may be found in U.S. Pat. Nos. 2,175,422 and 2,613,478. A disadvantage of this approach is that envelopment of the entire orchard is inefficient in the use of steam. Further, the steam may damage tree trunks, and the stationary equipment is expensive and inflexible.

SUMMARY OF THE INVENTION

It is an object of the present invention to provide a grove heater capable of injecting a vapor into a canopy formed by leaves on a tree.

It is another object of the present invention to provide a grove heater capable of passing from tree to tree in a grove.

It is yet another object of the present invention to provide a grove heater which will intermittently eject steam in a desired pattern.

These and other objects are achieved according to the present invention by providing apparatus comprising a vapor generator and at least one longitudinally extending arm provided with at least one valve defining a port when in its open position. This arm is arranged for injecting vapor from the generator into a canopy formed by leaves on a tree. In addition, a port may be provided on the arm for directing the vapor horizontally so as to warm the ground adjacent the trees.

According to a preferred feature of the present invention, the valve includes a tree detecting element arranged for moving the valve between an open position and a closed position in dependence on the detection of tree structure by the detecting element. Each valve employed is provided with such a detecting element.

Advantageously, the vapor generator is a steam generator mounted on a vehicle trailable through a citrus grove, and the like.

Apparatus according to the present invention prevents cold dehydration and other cold damage to trees by passing from tree to tree in a grove and injecting vapor, such as steam, into vapor retentive canopies formed by leaves on the trees.

The number of arms employed and the pattern of the vapor jets may be varied to suit a particular type of vegetation and grove arrangement. As subsequently used in this specification and claims, the word "tree" is intended to cover all suitable types of trees, shrubberies, and the like, while the word "grove" is meant to include all vegetation covered areas where there is no undergrowth.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an end elevational view showing the grove heater and grove of FIG. 1.

FIG. 3 is a side elevational view showing a grove heater according to the present invention attached to a tractor.

DESCRIPTION OF THE PREFERRED EMBODIMENTS

Figure 1:
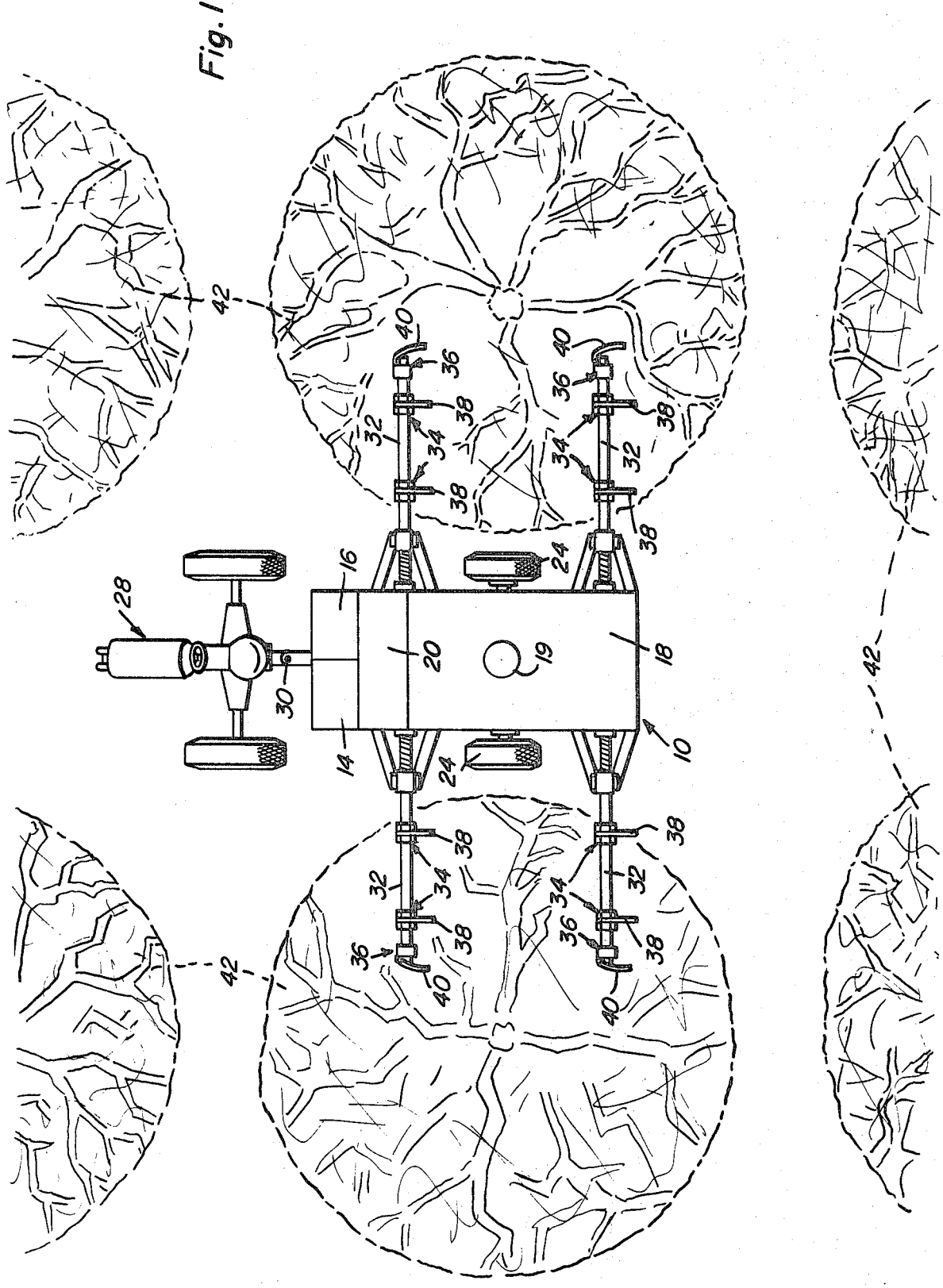
FIG. 1 is a fragmentary, top plan view showing a grove heater according to the present invention passing through a grove.

Referring now more specifically to the drawings, a grove heater 10 according to the present invention has a steam generating system arranged on a trailable vehicle. This steam generation system may include two firetube boilers 14 and 16 of conventional construction and arranged in tandem on the front end of vehicle 12. A water tank 18 provided with a hatch 19, a storage tank 20 for fuel oil, and the like, for firing boilers 14, 16, and a steam reservoir 22 which forms additionally the frame of vehicle 12 complete the steam generation system. Alternatively to the arrangement illustrated, the boilers could extend longitudinally along the sides of vehicle 12 with the fuel storage and water tanks arranged between them. A pair of wheels 24 mounted conventionally to an axle 26 afford mobility to vehicle 12. As is illustrated in the drawings, vehicle 12 may be trailed by a conventional tractor 28 connected to vehicle 12 as by a suitable, known hitch 30.

A plurality of arms 32, four being shown in the drawings, are mounted on vehicle 12, as to the frame formed by steam reservoir 22, and are arranged so as to extend longitudinally from vehicle 12. Each arm 32 is provided with a plurality of ports, each port arranged for ejecting a vapor jet in a predetermined direction. Valves 34 and 36 are mounted on arms 32 and are arranged in the aforementioned ports. Each of these valves 34 and 36 includes a tree detecting element in the form of a feeler wire 38 and 40 arranged for moving the valve 34, 36 between an open position and a closed position in dependence on the detection of adjacent tree structure by the detecting element. Feeler wires 38 and 40 are connected to the valve elements (not shown) of valves 34 and 36 in a conventional manner. In the illustrated embodiment, valves 34 are arranged to inject steam and the like up into the canopy of trees 42, while valves 36 direct the steam jet horizontally so as to warm the ground G adjacent trees 42. Feeler wires 40 of valves 36 are arranged in the opposite mode from feeler wires 38 of valves 34, so that the steam jet is stopped, or the associated port blocked, when feeler wire 40 contacts trunk 44 of a tree 42. This steam stoppage guards against the steam burning trunk 44.

In operation, a suitable fluid, such as water, is fed from tank 18 into boilers 14 and 16 by suitable lines (not shown) and converted to steam by the combustion of a suitable fuel, such as No. 2 fuel oil, fed into the boilers from tank 20. The resulting steam is fed into steam reservoir 22, which may be divided longitudinally to form separate storage compartments for steam from respective boilers 14 and 16. This steam reservoir 22 effectively forms a plenum which feeds the steam under a predetermined pressure into arms 32 and selectively out through valves 34 and 36.

A double boiler system, such as illustrated in the drawings, will permit doubling the heating capacity per hour when injecting steam into two rows of trees. A total capacity of 250 to 300 gallons per hour of water used in making steam would cover about 20 to 30 acres. This will permit one vehicle and driver to protect 300 acres, for example. The cold cycle only has to be broken every few hours. Further, the release of latent heat from the ground and atmosphere will increase actual heat many times beyond that put out by heater 10. The steam will penetrate and completely break the cold cycle.

Referring again to FIG. 2 of the drawings, the moved position of an arm 32 is made possible by pivotally mounting arms 32 about horizontal pivots 46. This pivotal mounting will permit arms 32 to be moved inboard of vehicle 12 when the vehicle is adjacent a fence, and the like. Arms 32 are advantageously constructed from, for example, insulated pipes, and are designed to maintain a predetermined constant pressure. It is desirable that the steam pressure be constant to all of the valves 34, 36 at all times. The horizontal position of arms 32 should be such that the limbs of the particular trees 42 will pass over the tops of the arms 32 but engage the feeler wires 38. The reverse operation of valves 36 by feeler wires 40 will not only protect trunks 44 from burn, but lower foilage of the trees 42 as well.

A conventional valve control system (not shown), such as a fluid or electrical system—a pneumatic system being preferred—may be provided to permit an operator (not shown) to actuate valves 34 and 36 from tractor 28. Such a system will permit the operator to remotely control the steam ejection.

It is to be understood that alternatively to mounting the steam generating equipment on a trailable vehicle 12, it may be mounted directly on a self-propelled vehicle (not shown).

Heater 10 according to the present invention takes advantage of the fact that the canopy formed by the leaves in a tree forms a barrier to cold and heat when a tree is exposed to freezing and dry air. This cold and dry air gradually draws heat and moisture through the air-layered leaves of the canopy until the inside of the tree reaches a state of low humidity and temperature and freeze damage occurs. First the leaves are affected, then the small limbs, the larger limbs, and finally the trunk of the tree. The primary function of heater 10 is to replenish the heat and moisture in the canopy of the tree, and reset the tree's protective cycle.

When heater 10 releases heat and moisture into the canopy in the form of steam, the canopy causes the moisture and heat to be absorbed into the entire tree and a new cycle of freeze protection begins. Since the heat and moisture is put directly into the tree, the only loss of significance is through the canopy. This means that most of the heat is used and retained by the tree. As a result, a single heater 10 according to the present invention can protect a large area at a fraction of the cost of conventional systems. Further, only one operator is required for heater 10, wherein other systems in use require a plurality of workers. An advantage of the present invention of great importance is that the ejection of steam into the atmosphere eliminates pollution caused by, for example, oil-burning orchard heaters. Any tree, hedge, or shrubbery that retains foilage in cold weather can be protected. During long periods of cold, the live steam can be periodically injected into the tree's canopy. Since freezing first removes moisture from the tree, it is most advantageous to re-supply this moisture. Further, steam distributes heat quite evenly, since steam jets will mix with cold, dry air, while hot air, for example, does not mix readily with cold air.

Alternatively to steam, a warm mist generated in the boilers may be injected in the tree canopy. Further, a mist may be used in conjunction with steam as by having one of the two boilers heat the water short of converting it to steam, the other boiler generate steam, and arrange the reservoirs and arms in a conventional manner not shown to inject both steam and mist, two separate mediums and qualities of humidity, into a tree canopy to give a more complete reversal of the canopy's cold cycle in certain situations. It is to be understood that the term "vapor" as used herein means either steam or mist, or both steam and mist.

The foregoing is considered as illustrative only of the principles of the invention. Further, since numerous modifications and changes will readily occur to those skilled in the art, it it not desired to limit the invention to the exact construction and operation shown and described, and accordingly all suitable modifications and equivalents may be resorted to, falling within the scope of the invention.

What is claimed as new is as follows:

1. A grove heater for re-setting the cold protective cycle of a tree, comprising, in combination:
   a. a vehicle adapted to pass along a row of trees;
   b. means for providing a vapor; and
   c. means mounted on the vehicle for injecting vapor received therefrom into each canopy formed by leaves of trees the vehicle is passing, the means for injecting including an arm mounted on and extending transversely from the vehicle and a pair of valves provided on the arm and in fluid communication with said vapor providing means, one of the valves being a normally closed valve arranged on the arm and including a port oriented for selectively vertically injecting vapor directly into the trees from below the canopies of same, the normally closed valve including a tree detecting element arranged for moving the valve to a port open position in dependence on the detection of adjacent tree structure by the detecting element, the valve being in a port closed position when the vehicle is between trees, and the arm being provided at an outward end with a normally open valve also having a detecting element and including a further port directed horizontally and arranged for being closed when the detecting element associated with the normally open valve detects adjacent tree structure, the normally open valve arranged for warming ground adjacent the trees.

2. A structure as defined in claim 1, wherein there is a plurality of arms pivotally mounted on the vehicle for movement about a horizontal axis, each arm being provided with a vertically directed valve and a horizontally directed valve.

3. A structure as defined in claim 2, wherein the vapor providing means is a steam generator mounted on the vehicle, the generator including at least one boiler, a water tank and a fuel storage tank connected to the boiler to feed water and fuel thereto, and a steam reservoir connected to the boiler for receiving steam therefrom, the arms arranged communicating with the steam reservoir for receiving steam therefrom.

* * * * *